United States Patent
Ikeji et al.

(10) Patent No.: US 9,321,412 B2
(45) Date of Patent: Apr. 26, 2016

(54) MOLDED INTERIOR MATERIAL FOR VEHICLE AND MANUFACTURING METHOD THEREOF

(71) Applicants: Hiroki Ikeji, Aichi (JP); Hiroshi Suzuki, Aichi (JP)

(72) Inventors: Hiroki Ikeji, Aichi (JP); Hiroshi Suzuki, Aichi (JP)

(73) Assignee: HAYASHI TELEMPU Co., Ltd., Nagoya-shi, Aichi (JP)

( * ) Notice: Subject to any disclaimer, the term of this patent is extended or adjusted under 35 U.S.C. 154(b) by 217 days.

(21) Appl. No.: 14/301,292

(22) Filed: Jun. 10, 2014

(65) Prior Publication Data

US 2014/0302285 A1    Oct. 9, 2014

Related U.S. Application Data

(63) Continuation of application No. PCT/JP2012/076411, filed on Oct. 12, 2012.

(30) Foreign Application Priority Data

Dec. 13, 2011    (JP) .................................. 2011-271807

(51) Int. Cl.
*B32B 3/00*    (2006.01)
*B60R 13/00*    (2006.01)
(Continued)

(52) U.S. Cl.
CPC ................. *B60R 13/02* (2013.01); *B32B 3/263* (2013.01); *B32B 5/245* (2013.01); *B32B 38/0012* (2013.01); *B60N 3/042* (2013.01);
(Continued)

(58) Field of Classification Search
CPC ............. B32B 2605/003; B32B 3/263; B32B 2605/08; B32B 38/0012; B60N 3/042; B60N 3/048; B60N 3/04; B60N 3/044; B60R 13/02; B60R 13/01; B60R 13/0815; Y10T 156/1043; Y10T 428/24521
USPC ................... 428/31, 95, 156, 161; 296/97.23; 156/221
See application file for complete search history.

(56) References Cited

U.S. PATENT DOCUMENTS 8,727,417 B2    5/2014 Eguchi et al.

FOREIGN PATENT DOCUMENTS

CN    102161330 A    8/2011
JP    H02-088841 U    7/1990
(Continued)

OTHER PUBLICATIONS

International Search Report for PCT/JP2012/076411 dated Jan. 8, 2013.
(Continued)

*Primary Examiner* — Catherine A Simone
(74) *Attorney, Agent, or Firm* — Yokoi & Co., U.S.A., Inc.; Toshiyuki Yokoi

(57) ABSTRACT

The present invention discloses a molded interior material for a vehicle. A press molded decorative layer that faces a vehicle compartment and a buffer material layer that faces a vehicle body panel are at least press molded, the buffer material layer formed by press molding a fiber structure in which fibers are oriented in a thickness direction. On the decorative layer, a convex portion corresponding to a convex surface of the vehicle body panel is formed. On the buffer material layer, a compression molded portion, which is recessed away from the convex surface of the vehicle body panel toward the convex portion of the decorative layer so that a thickness is 0.03 to 0.5 times of a thickness of a surrounding area and a density is higher than that of the surrounding area, is formed.

6 Claims, 13 Drawing Sheets

(51) Int. Cl.
  *B60R 13/02* (2006.01)
  *B32B 5/24* (2006.01)
  *B32B 3/26* (2006.01)
  *B60N 3/04* (2006.01)
  *B32B 38/00* (2006.01)

(52) U.S. Cl.
  CPC .......... *B60N 3/048* (2013.01); *B32B 2605/003* (2013.01); *B32B 2605/08* (2013.01); *Y10T 156/1043* (2015.01); *Y10T 428/24521* (2015.01)

(56) References Cited

FOREIGN PATENT DOCUMENTS

JP    2007-050558 A    3/2007
JP    2011-173446 A    9/2011

OTHER PUBLICATIONS

PCT written openion dated Jan. 8, 2013.
Chinese Office Action dated Nov. 4, 2015.

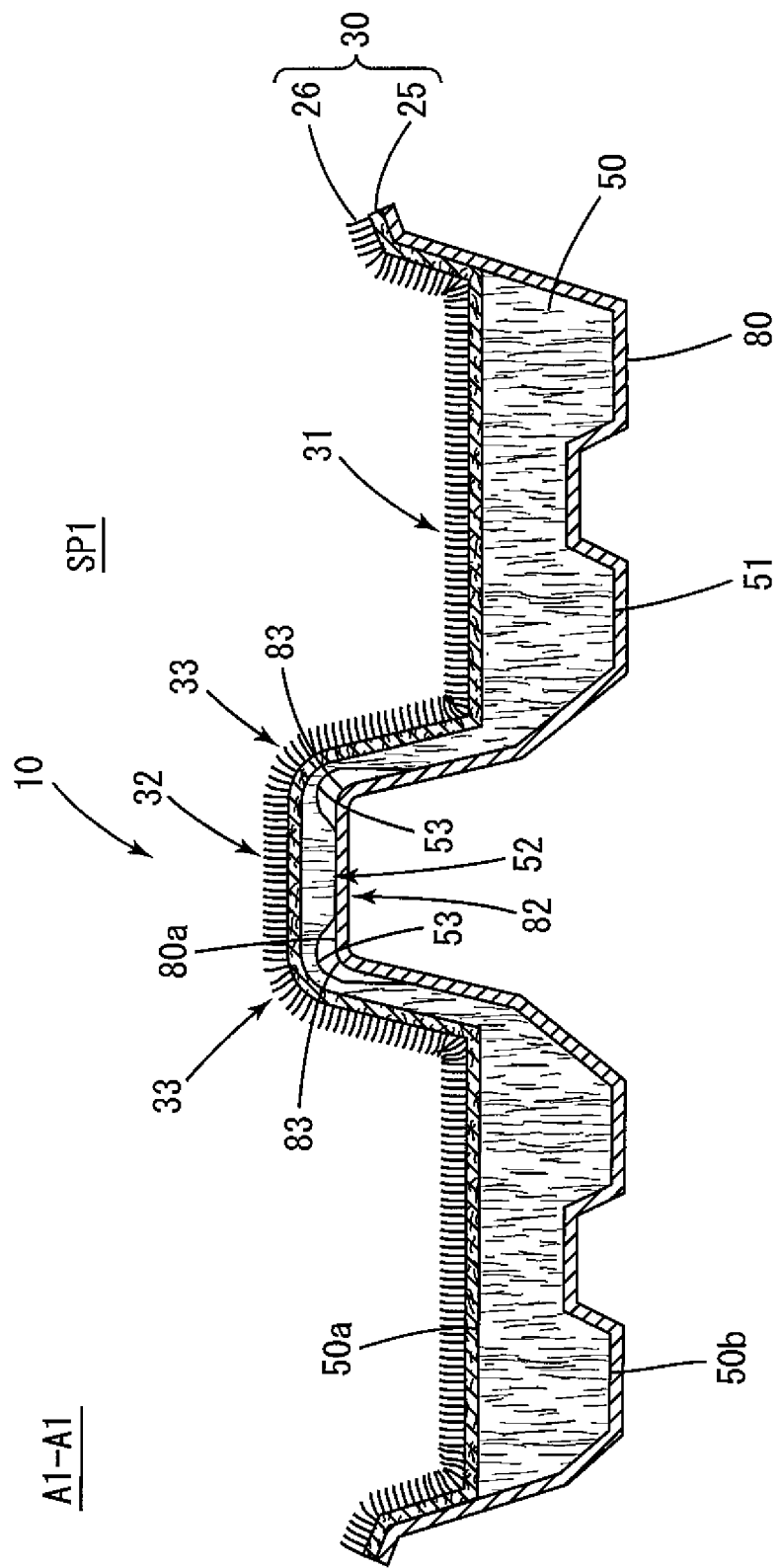

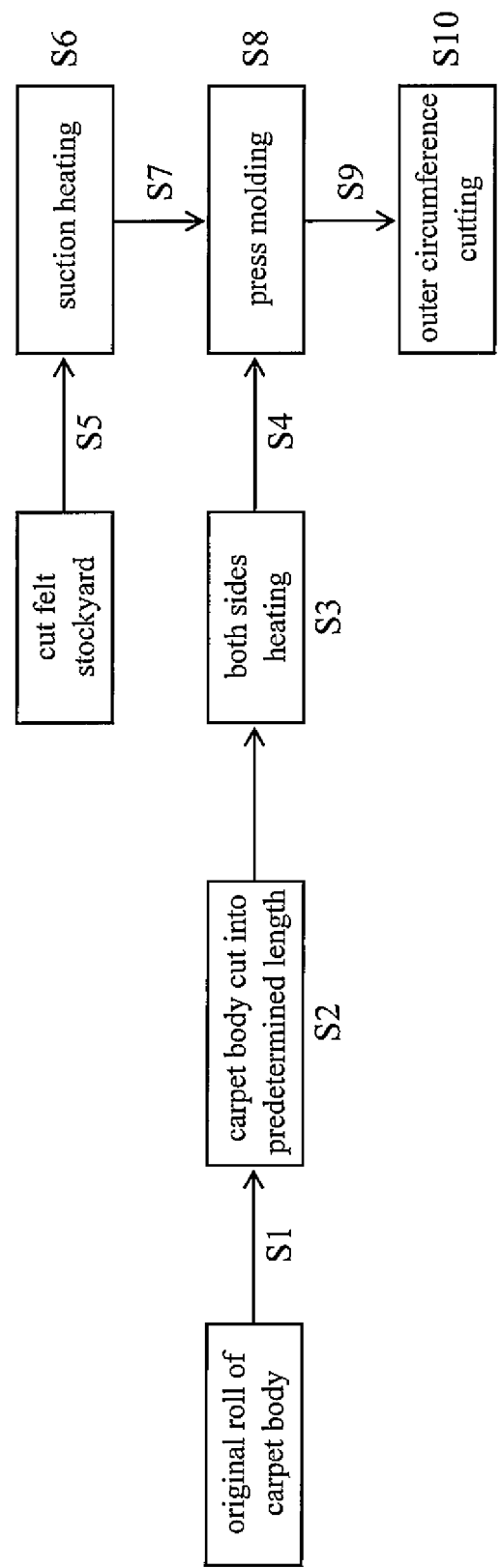

COMPARATIVE EXAMPLE

MOLDED INTERIOR MATERIAL FOR VEHICLE AND MANUFACTURING METHOD THEREOF

CROSS-REFERENCES TO RELATED APPLICATIONS

This Application claims the benefit of priority and is a Continuation application of the prior International Patent Application No. PCT/JP2012/076411, with an international filing date of Oct. 12, 2012, which designated the United States, and is related to the Japanese Patent Application No. 2011-271807, filed Dec. 13, 2011, the entire disclosures of all applications are expressly incorporated by reference in their entirety herein.

BACKGROUND OF THE INVENTION

1. Field of the Invention

The present invention relates to a molded interior material for a vehicle having a decorative layer that faces a vehicle compartment and a buffer material layer that faces a vehicle body panel, and manufacturing method thereof.

2. Description of Related Art

For example, on a vehicle body panel of an automobile, various kinds of molded interior materials are laid to improve decorative properties and add a touch of class. On the upper side of the vehicle body panel from a floor panel to a toe board rising upward, floor carpets such as a tufted carpet and a needle punched carpet are usually laid as a molded interior material. At the center in a vehicle width direction of the floor panel and the toe board panel, a tunnel portion, which is raised upward and extending in a front-rear direction, is formed so as to insert a drive shaft. Therefore, the floor carpet is press molded into a deep drawn shape corresponding to the tunnel portion having a high (deep) convex shape.

The molded interior material such as a floor carpet is formed, for example, by heating the decorative layer and the buffer material layer in a stacked state or in a separate state to plasticate components of thermoplastic resin (thermoplastic fiber) contained inside, placing them between a pair of male and female press forming dies having a predetermined shape, and then performing a drawing process. After the components of the thermoplastic resin, which are plasticated, are cooled and solidified, a shape of the interior material is fixed.

In addition, in order to improve cushioning properties, sound absorbing properties and sound insulating properties of the floor carpet and to improve occupant safety, buffer materials such as a felt and a foam body and raising materials are sometimes provided. A molded laying interior material described in Japanese Unexamined Patent Application Publication No. 2011-173446 has a buffer material layer formed by press molding a fiber structure in which fibers are orientated in a thickness direction. The buffer material layer is light weight and has high cushioning properties. Therefore, it has an excellent property as the buffer material, and is suitable for combining with a breathable carpet to improve the sound absorbing properties.

However, it is found that the buffer material layer formed by press molding a fiber structure in which fibers are orientated in a thickness direction is, on the contrary, occasionally difficult to perform the conventional drawing process because the cushioning properties are high.

BRIEF SUMMARY OF THE INVENTION

The present invention discloses a molded interior material for a vehicle to prevent an angular shape of the corner of the decorative layer, which is corresponding to the convex surface of the vehicle body panel, from being collapsed into a rounded shape.

One aspect of the present invention provides a molded interior material for a vehicle, wherein a press molded decorative layer that faces a vehicle compartment and a buffer material layer that faces a vehicle body panel having a convex surface are at least laminated, the buffer material layer formed by press molding a fiber structure in which fibers are oriented in a thickness direction, a convex portion corresponding to the convex surface of the vehicle body panel is formed on the decorative layer, and a compression molded portion, which is recessed away from the convex surface of the vehicle body panel toward the convex portion of the decorative layer so that a thickness of the compression molded portion is 0.03 to 0.5 times of a thickness of a surrounding area and a density of the compression molded portion is higher than that of the surrounding area, is formed on the buffer material layer.

Another aspect of the present invention provides a manufacturing method of a molded interior material for a vehicle, wherein a decorative layer that faces a vehicle compartment and a buffer material layer that faces a vehicle body panel having a convex surface are at least laminated, at least a decorative material to form the decorative layer and a fiber structure in which fibers are oriented in a thickness direction to form the buffer material layer are press molded, a convex portion corresponding to the convex surface of the vehicle body panel is formed on the decorative layer, and a compression molded portion, which is recessed away from the convex surface of the vehicle body panel toward the convex portion of the decorative layer so that a thickness of the compression molded portion is 0.03 to 0.5 times of a thickness of a surrounding area and a density of the compression molded portion is higher than that of the surrounding area, is formed on the buffer material layer.

BRIEF DESCRIPTION OF THE DRAWINGS

FIG. 2 is a drawing showing an example of a vertical end surface obtained when the floor carpet 10 is cut together with a vehicle body panel 80 in a position corresponding to the A1-A1 line in FIG. 1.

FIG. 11 is a block diagram schematically showing an example of a manufacturing method of the floor carpet 10.

DETAILED DESCRIPTION OF THE INVENTION

Figure 13A:
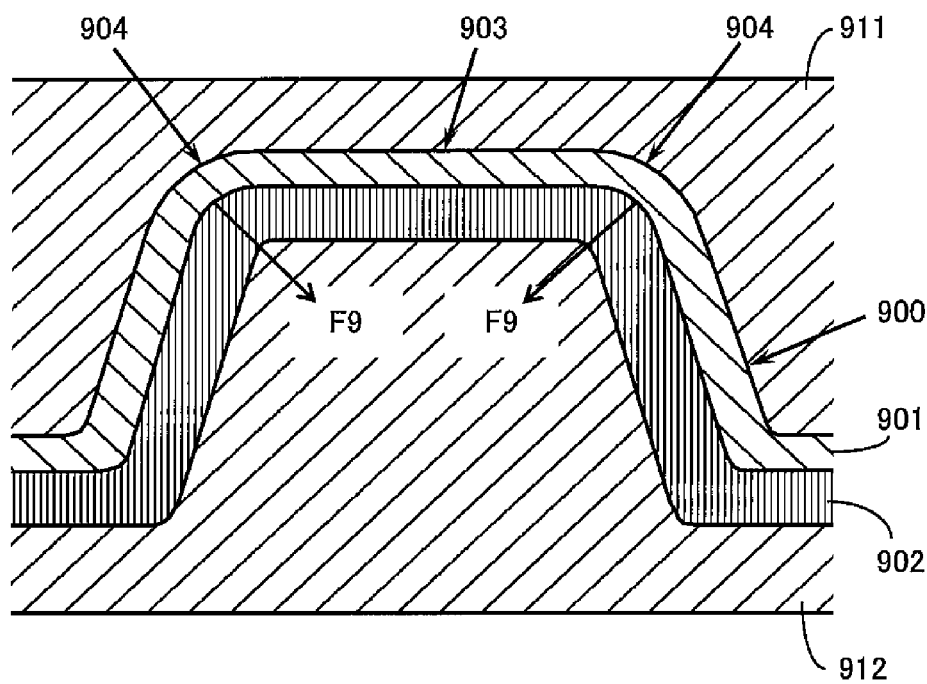
FIG. 13A is a vertical end surface view schematically showing an example of the most preferable molded state of a floor carpet 900.

FIG. 13A schematically shows an example of the most preferable molded state of a floor carpet 900 in which a decorative material 901 is press molded into a deep drawn shape together with a buffer material 902 by an upper mold 911 and a lower mold 912.

When press molding the decorative material 901 and the buffer material 902, a drawing rate of the floor carpet 900 is the highest near a corner portion 904 of a raised portion 903, which is high. A stretching ratio of this portion is about twice as high as that of a general portion of the carpet, at the maximum. When stretching the decorative layer, although the decorative layer is pre-heated and the components of the thermoplastic resin are plasticated so that the decorative layer is changed into a state of being easily stretched to a certain extent, a certain tensional force against the stretching is still remained. If the decorative layer is plasticated until the tensional force disappears, on the contrary, the decorative layer cannot be drawn into a predetermined shape and an appearance of a decorative surface of a carpet layer is deteriorated because fluff is crushed. Therefore, the formed floor carpet 900 receives a force F9 from the corner portion 904 of the raised portion in a direction for pressing the buffer material 902 to the forming die (lower mold 912) by the tensional force of the decorative material 901.

Figure 13B:
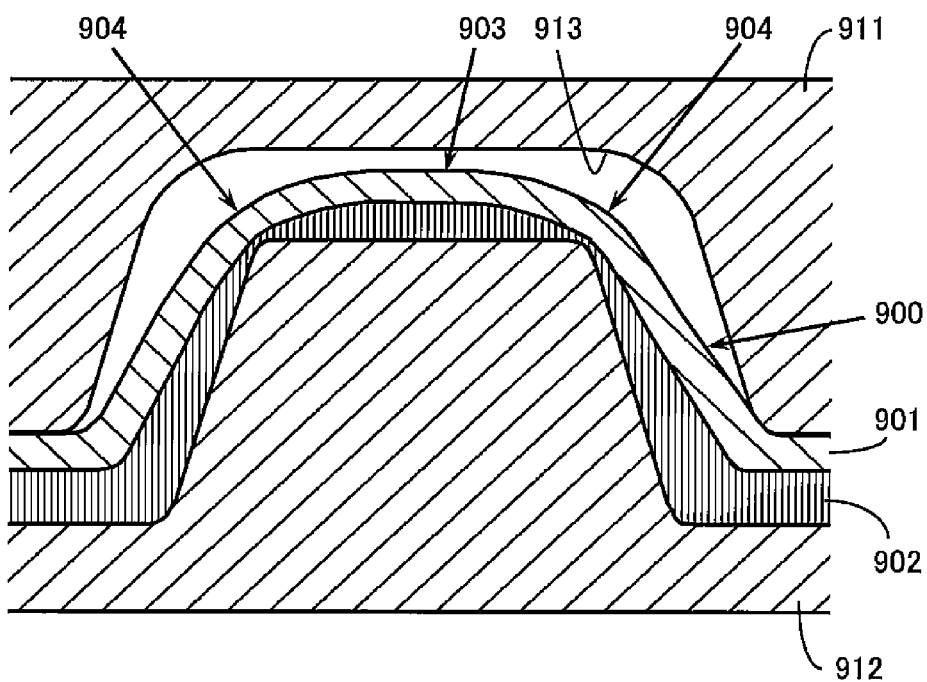
FIG. 13B is a vertical end surface view schematically showing an example of an actual molded state of the floor carpet 900 as a comparative example.

When using the fiber structure, which has fibers oriented in the thickness direction and has high cushioning properties, as the buffer material, the fiber structure is also heated and plasticated, and therefore a force to resist the tensional force of the decorative material 901 is weak. Therefore, as schematically shown in FIG. 13B, a thickness of the buffer material 902 is reduced to about 10%, for example, at a portion corresponding to the corner portion 904 compared to the original thickness, yielding to the tensional force of the decorative material 901. Consequently, the formed floor carpet 900 is apart from a molding surface 913, which indicates a desired shape, at the corner portion 904, and an appearance is collapsed into a rounded shape without forming a sharp angular shape at a deeply raised portion such as the tunnel portion.

Note that, if both of left and right corner portions 904 are collapsed as shown in FIG. 13B, although an appearance seems to be well-balanced, a position of an upper surface of the raised portion 903 is relatively lowered compared to the predetermined position.

One aspect of the present invention provides a molded interior material for a vehicle, wherein a press molded decorative layer that faces a vehicle compartment and a buffer material layer that faces a vehicle body panel having a convex surface are at least laminated, the buffer material layer formed by press molding a fiber structure in which fibers are oriented in a thickness direction, a convex portion corresponding to the convex surface of the vehicle body panel is formed on the decorative layer, and a compression molded portion, which is recessed away from the convex surface of the vehicle body panel toward the convex portion of the decorative layer so that a thickness of the compression molded portion is 0.03 to 0.5 times of a thickness of a surrounding area and a density of the compression molded portion is higher than that of the surrounding area, is formed on the buffer material layer.

Another aspect of the present invention provides a manufacturing method of a molded interior material for a vehicle, wherein a decorative layer that faces a vehicle compartment and a buffer material layer that faces a vehicle body panel having a convex surface are at least laminated, at least a decorative material to form the decorative layer and a fiber structure in which fibers are oriented in a thickness direction to form the buffer material layer are press molded, a convex portion corresponding to the convex surface of the vehicle body panel is formed on the decorative layer, and a compression molded portion, which is recessed away from the convex surface of the vehicle body panel toward the convex portion of the decorative layer so that a thickness of the compression molded portion is 0.03 to 0.5 times of a thickness of a surrounding area and a density of the compression molded portion is higher than that of the surrounding area, is formed on the buffer material layer.

The compression molded portion of the buffer material layer is recessed away from the convex surface of the vehicle body panel toward the convex portion of the decorative layer so that a thickness of the compression molded portion is 0.03 to 0.5 times of a thickness of a surrounding area and a density of the compression molded portion is higher than that of the surrounding area. Therefore, an angular shape of the corner of the decorative layer, which is corresponding to the convex surface of the vehicle body panel, can be prevented from being collapsed into a rounded shape.

In this case, the molded interior material for a vehicle can be a floor carpet having a buffer material layer, a dash silencer having a buffer material layer, and a side wall trim having a buffer material layer, for example.

The decorative layer can be a carpet layer, a nonwoven fabric layer, a woven layer, a knitted layer, and a leather layer, for example.

If the fibers of the fiber structure are oriented in the thickness direction, it means that an orientation direction of the fibers matches relatively well with a direction perpendicular to the top surface and reverse surface of the buffer material and the fibers can contain folded-back portions for orienting the fibers in the thickness direction. Since the fibers constituting the fiber structure can have a curved shape, the fibers of the fiber structure being oriented in the thickness direction does not mean that straight fibers are arranged parallel to each other in the thickness direction of the fiber structure.

From the above, the fiber structure in which fibers are oriented in the thickness direction can be a fiber structure of a wavelike shape in which webs are repeatedly folded back in the thickness direction, a fiber structure obtained by dividing the fiber structure of the wavelike shape into two parts at the middle in the thickness direction, a fiber structure in which folded-back portions of the fiber structure of the wavelike shape are cut out, and a fiber structure in which webs are repeatedly laminated, for example.

The fibers constituting the fiber structure can be a fiber of single kind or a combination of two or more kinds of fibers, such as a combination of a main fiber and an adhesive fiber.

The buffer material layer can be provided only on a part of the surface of the molded interior material for a vehicle on the side of the vehicle body panel, and such a molded interior material for a vehicle is also included in the claims.

Another layer such as a perforated resin layer or a sound absorbing layer can be provided between the decorative layer and the buffer material layer in the molded interior material for a vehicle, and such a molded interior material for a vehicle is also included in the claims.

Further, a molded interior material for a vehicle in which a separate member such as a felt is post-applied after the decorative layer and the buffer material layer have already been formed is also included in the claims.

The convex surface of the vehicle body panel can be any surfaces as long as the surface is raised toward the buffer material layer. The convex surface can be an angular ridge portion of a raised portion, a bulged surface and a projecting surface, for example. The convex surface is not limited to a curved surface. The convex surface can be a surface including a portion formed to be an angle of more than 0° and less than 180° (minor angle).

The convex portion of the decorative layer can be a swollen convex ridge portion, a protruded convex ridge portion, and a swollen portion in a spot-like shape, for example.

The compression molded portion of the buffer material layer can be a concave groove portion recessed in an arc-shape in cross section, a concave groove portion recessed in a re-entrant angle-shape, and a concave portion in a spot-like shape, for example.

According to the aspect of the present invention, the molded interior material for a vehicle can be provided to prevent an angular shape of the corner of the decorative layer, which is corresponding to the convex surface of the vehicle body panel, from being collapsed into a rounded shape.

According to a first optional aspect of the present invention, the molded interior material for a vehicle can be provided to prevent an angular shape of the corner of the decorative layer, which is corresponding to the angular ridge portion of the raised portion of the vehicle body panel, from being collapsed into a rounded shape.

According to a second optional aspect of the present invention, a suitable molded interior material for a vehicle can be provided to prevent an angular shape of the corner of the decorative layer, which is corresponding to the angular ridge portion of the raised portion of the vehicle body panel, from being collapsed into a rounded shape.

According to a third optional aspect of the present invention, the molded interior material for a vehicle can be provided to form an angular shape of the decorative layer on a relatively large area.

An embodiment of the present invention will be described below. Of course, the below-described embodiment merely exemplifies the present invention.

(1) Configuration of Molded Interior Material for Vehicle

FIGS. 1 to 10 show examples of a molded interior material for a vehicle of the present invention used as a floor carpet of an automobile. In the figures, FRONT represents the front side and REAR represents the rear side of the automobile.

Figure 1:
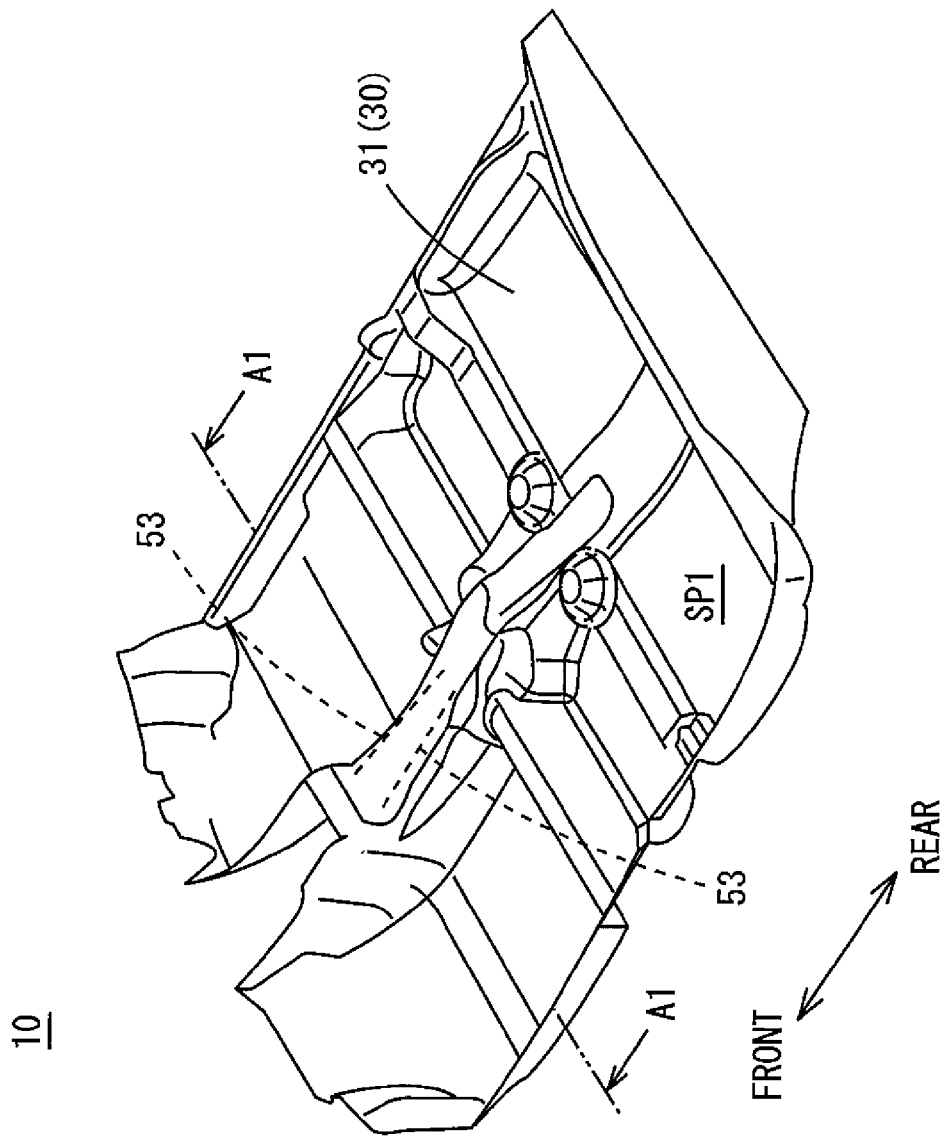
FIG. 1 is a perspective view showing an example of an external appearance of a floor carpet (molded interior material for a vehicle) 10 on a vehicle compartment SP1 side according to one embodiment of the present invention.

The floor carpet 10 shown in FIG. 1 is a molded interior material for a vehicle to be placed on a substantially flat floor panel (a kind of a vehicle body panel) constituting a floor surface of a vehicle body or placed on a toe board panel (a kind of a vehicle body panel) rising upward from a floor panel surface in a front portion of an occupant compartment. The floor carpet 10 is laid on a vehicle compartment SP1 side (vehicle compartment side surface 80a) of a vehicle body panel 80 and decorates an interior of the occupant compartment. The floor carpet 10 is molded into a three-dimensional shape to avoid protruding portions such as a console and a rocker panel and to partially follow vertical walls of the protruding portions.

Figure 4A:
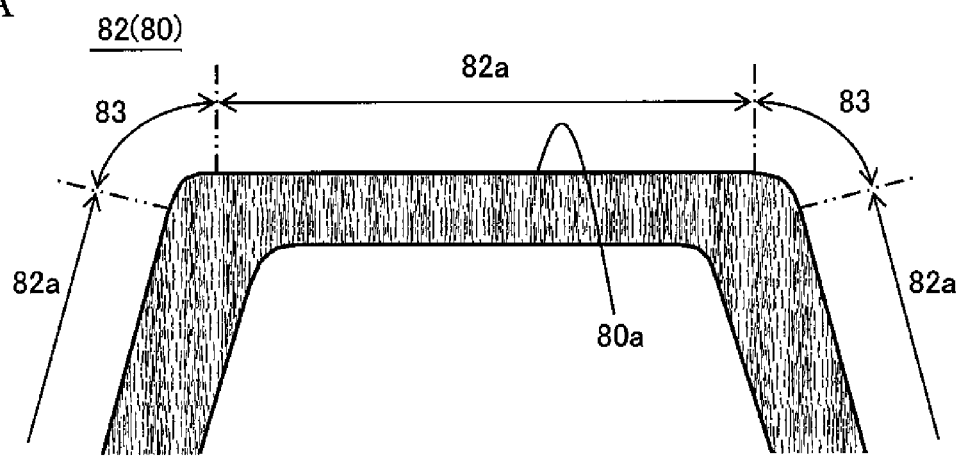
FIG. 4A is a vertical end surface view schematically showing an example of a main portion of a tunnel portion (raised portion) 82 of the vehicle body panel 80.

As shown in the vertical end surface view of FIG. 2, a tunnel portion (raised portion) 82, which is swelling upward and extending in a front-rear direction, is formed at the center in a vehicle width direction of the floor panel and the toe board panel. As also shown in FIG. 4A, the tunnel portion 82 is a portion raised from a general portion of the entire vehicle body panel 80 so as to insert a drive shaft in a vehicle front-rear direction. A height of the tunnel portion 82 is about 100 to 300 mm, for example. Angular ridge portions 83, 83 located at left and right of the tunnel portion 82 are more protruded toward a buffer material layer 50 and are more protruded than a general portion 82a around the angular ridge portion 83. Note that the "ridge" and "groove" means a line. The angular ridge portion means a portion having an angular shape when compared relatively to the surrounding area. The angular ridge portion is not strictly limited to a portion formed to be obtuse angle, right angle and acute angle (minor angle; an angle more than 0° and less than 180°). The angular ridge portion can be a portion protruded in a curved shape. Although the general portion 82a of the tunnel portion is shown as a flat plane in FIG. 4A, the general portion 82a can be curved when viewed in a vertical cross-section perpendicular to a longitudinal direction (front-rear direction) of the tunnel portion 82 with a curvature smaller than that of the angular ridge portion 83. In other words, a radius of curvature of the general portion 82a can be larger than that of the angular ridge portion 83.

The interior material of the present embodiment, which is exemplified by the floor carpet 10, is especially suitable for a corner portion, which is deeply protruded into the occupant compartment, of a molded portion.

A basic portion of the floor carpet 10 is constituted by a carpet layer (decorative layer) 30 and a buffer material layer 50.

Figure 4B:
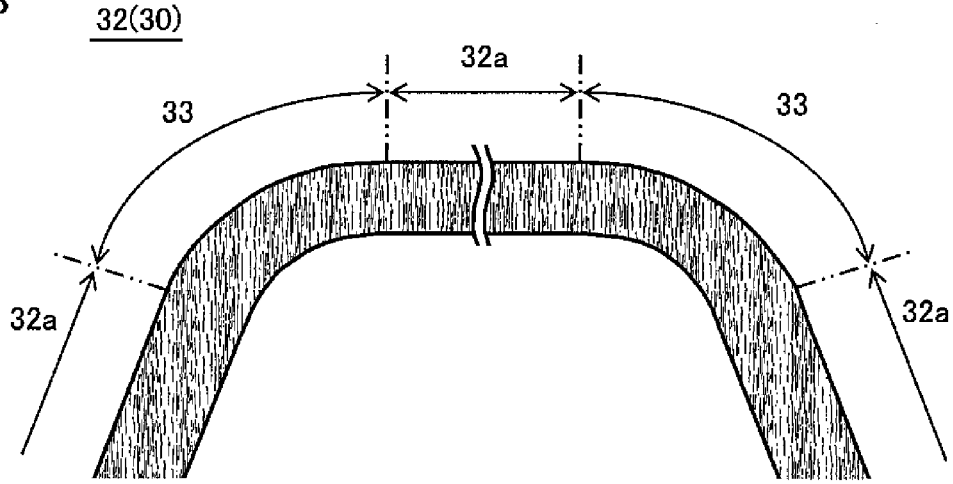
FIG. 4B is a vertical end surface view schematically showing an example of a main portion of a raised portion 32 of a carpet layer (decorative layer) 30.
Figure 12:
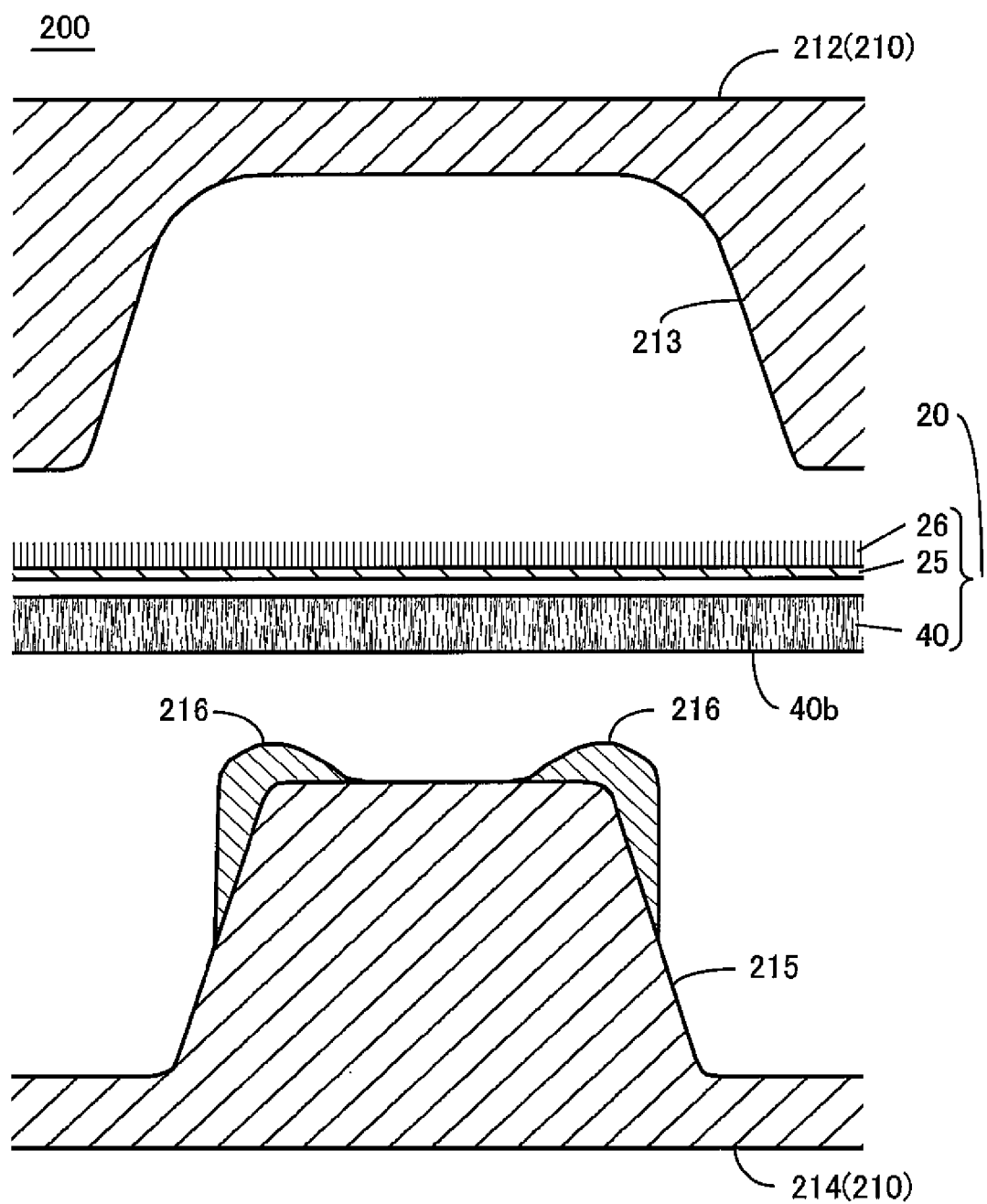
FIG. 12 is a vertical end surface view schematically showing an example of a manufacturing method of the floor carpet 10.

In the carpet layer 30, a concavo-convex shape 31 of the vehicle compartment side is formed by press molding a carpet body (decorative material) shown in FIG. 12, which is not yet molded to be the carpet layer, and the carpet layer is arranged to face the vehicle compartment SP1. As also shown in FIG. 4B, near the tunnel portion 82, a raised portion 32, which is raised from a general portion of the entire carpet layer 30, is formed on the carpet layer 30. On the raised portion 32, convex ridge portions (convex portions) 33, which are corresponding to the angular ridge portions (convex surfaces) 83 of the tunnel portion 82, are formed. The convex ridge portions 33 located at left and right of the raised portion 32 are protruded toward an opposite side of the buffer material layer 50 and are more protruded than a general portion 32a around the convex ridge portion 33. The convex ridge portion can be a streaky swollen portion and a streaky protruded portion. Although the general portion 32a of the raised portion is shown as a flat plane in FIG. 4B, the general portion 32a can be curved when viewed in a vertical cross-section perpendicular to a longitudinal direction (front-rear direction) of the raised portion 32 with a curvature smaller than that of the convex ridge portion 33. In other words, a radius of curvature of the general portion 32a can be larger than that of the convex ridge portion 33.

Figure 5:
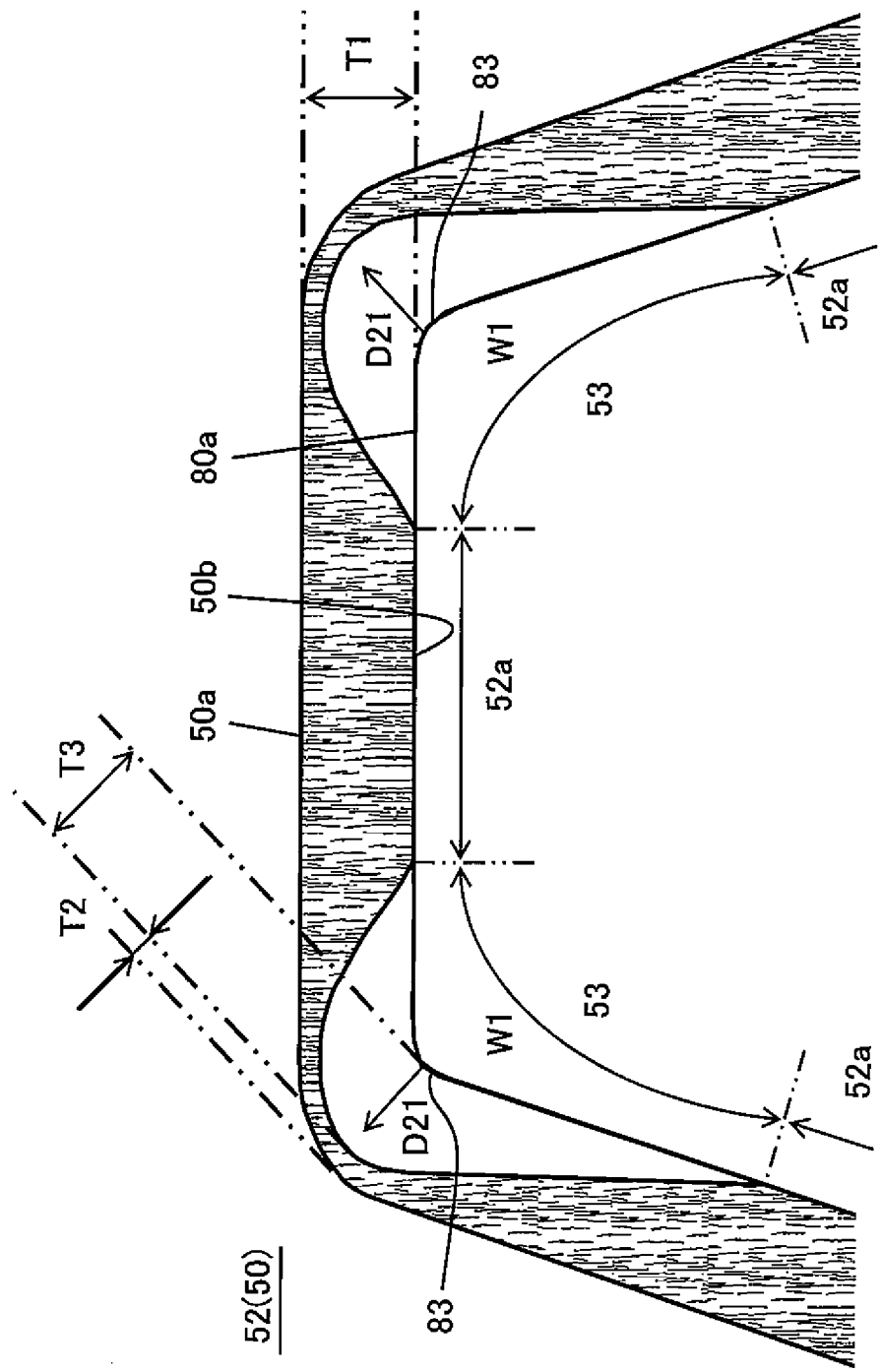
FIG. 5 is a vertical end surface view schematically showing an example of a main portion of a depressed portion 52 of a buffer material layer 50.

In the buffer material layer 50, a concavo-convex shape 51 of the vehicle body panel 80 side is formed by press molding a fiber structure 40, which is not yet molded, and the concavo-convex shape 51 is arranged to face the vehicle body panel 80. As also shown in FIG. 5, near the tunnel portion 82, a depressed portion 52, which is depressed from a general portion of the entire buffer material layer 50 when viewed from a bottom side, is formed on the buffer material layer 50. A depth of the depressed portion 52 is about 100 to 300 mm, for example. On the depressed portion 52, concave groove portions (compression molded portions) 53, which are recessed away from the angular ridge portion 83 of the tunnel portion 82 toward the convex ridge portion 33 of the carpet layer 30, are formed. A thickness T2 of the concave groove portion 53 is 0.03 to 0.5 times of a thickness T1 of the surrounding area (general portion 82a), which faces the tunnel portion 82. A density of the concave groove portion 53 is higher than that of the surrounding area (general portion 82a), which faces the tunnel portion 82.

The concave groove portions 53 located at left and right of the depressed portion 52 are recessed toward the convex ridge portion 33 of the decorative layer and the concave groove portions 53 are more recessed than the general portion 52a around the concave groove portion 53. The concave groove portion can be a concave portion having an arc-shape when viewed in a vertical cross-section perpendicular to the extension direction, or a concave portion having a re-entrant angle-shape when viewed in a vertical cross-section perpendicular to the extension direction, for example. Note that the "arc-shape" can be any shapes as long as an arch shape is formed as a whole, and a linear portion can be partially included. The "re-entrant angle-shape" means a concave relatively angulated at an angle (major angle) of more than 180° and less than 360° without limited to the re-entrant angle in a strict sense, and also includes a concaved portion having a curved surface. Although the general portion 52a of the depressed portion is shown as a flat plane in FIG. 5, the general portion 52a can be curved when viewed in a vertical section perpendicular to a longitudinal direction (front-rear direction) of the depressed portion 52 with a curvature smaller than that of the concave groove portion 53. In other words, a radius of curvature of the general portion 52a can be larger than that of the concave groove portion 53.

In the floor carpet 10, the carpet layer 30 and the buffer material layer 50 are at least laminated and integrated. In the buffer material layer 50 shown in FIG. 2, a decorative layer side surface 50a, which is a top surface side, is adhered to the carpet layer 30. In addition, a panel side surface 50b, which is a back surface side, faces the vehicle body panel 80 and is in contact with the vehicle body panel 80. Although details will be explained later, a fiber structure 40 is a structure in which fibers 44 are orientated in a thickness direction D3 as shown, for example, in FIG. 7. Although the buffer material layer 50 formed from the fiber structure 40 has an excellent feature of light weight and high cushioning properties, it is also found that corners of the raised portion are easily collapsed into a rounded shape as shown in FIG. 13B when deep drawing is carried out. The present invention has an aspect of a method of maintaining a shape of the corners of the decorative layer substantially as designed by providing the compression molded portion on the buffer material layer of the molded interior material.

The carpet layer 30 is a decorative layer imparting the floor carpet 10 with various properties such as decorative property, good feel, and wear resistance. The carpet layer 30 shown in FIG. 2 is a tufted carpet formed by tufting a pile yarn in a foundation cloth having back stitches of piles 26 in a base layer 25. A large number of piles 26 are raised on the vehicle compartment SP1 side of the base layer 25. Of course, for the carpet layer, a needle punched carpet, in which a nonwoven fabric is needled to intertwine fibers and fluff is formed on the surface, can be also used, for example.

For the pile yarn constituting the piles 26, polyolefin-based fibers such as a PP (polypropylene) fiber, polyamide-based fibers, polyester-based fibers such as a PET (polyethylene terephthalate) fiber, acryl-based fibers, and other synthetic fibers can be used, for example.

When the base layer 25 is constituted by the foundation cloth, various kinds of nonwoven fabrics such as a spunbond nonwoven fabric and knitted materials of various kinds of fibers can be used for the foundation cloth. For the fiber constituting the foundation cloth, synthetic fibers composed of polyesters and polyolefin resins such as a PP and an ethylene-propylene copolymer can be used, for example. A backing can be provided on the reverse surface (surface of the buffer material layer 50 side) of the foundation cloth. For the backing, resin materials (inclusive of elastomers) and fiber materials can be used, for example.

The resin materials can be any materials as long as they include a resin. The resin materials can be a material composed only of the resin or a material having an additive such as a filler added thereto. The resin constituting the resin material is preferably a synthetic resin, and more preferably a thermoplastic resin. For the thermoplastic resin, a thermoplastic resin having low melting point (100 to 150° C.) is preferred, and olefin based resins such as a low-density polyethylene, olefin-based thermoplastic elastomers, and ethylene-vinyl acetate copolymers can be used, for example. For the fiber constituting the fiber material, fibers of synthetic resins (inclusive of elastomers), fibers obtained by adding an additive to a synthetic resin, and inorganic fibers can be used for example, and fibers including a thermoplastic fiber are preferred. For the resin constituting the thermoplastic fiber, a thermoplastic resin having low melting point is preferred, and olefin-based resins such as a low-density polyethylene, olefin-based thermoplastic elastomers, and ethylene-vinyl acetate copolymers can be used, for example.

When the tufted carpet is formed by heating, it is preferred that a backing of the thermoplastic resin is provided. On the other hand, the needle punched carpet can be formed without the backing. For example, the needle punched carpet can be formed by inserting a thermoplastic resin having relatively low melting point into an original fabric at a predetermined ratio and then heating the mixture to plasticate the thermoplastic resin having low melting point included in the original fabric.

A weight per unit area of a carpet body 20 constituting the carpet layer 30 can be about 200 to 600 g/m$^2$, for example.

Figure 7:
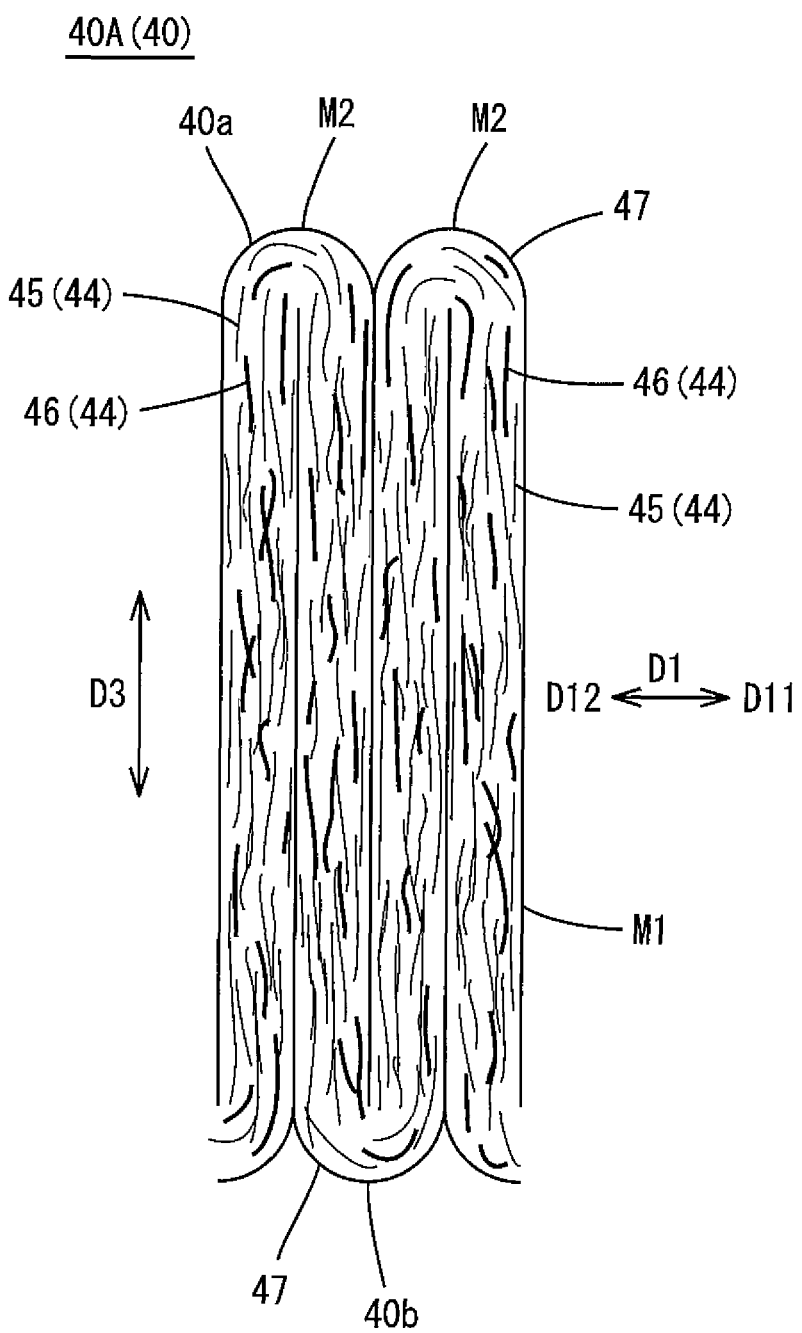
FIG. 7 is a side view showing an example of a main portion of a fiber structure 40A in which folded-back portions 47 are kept remained.
Figure 8A:
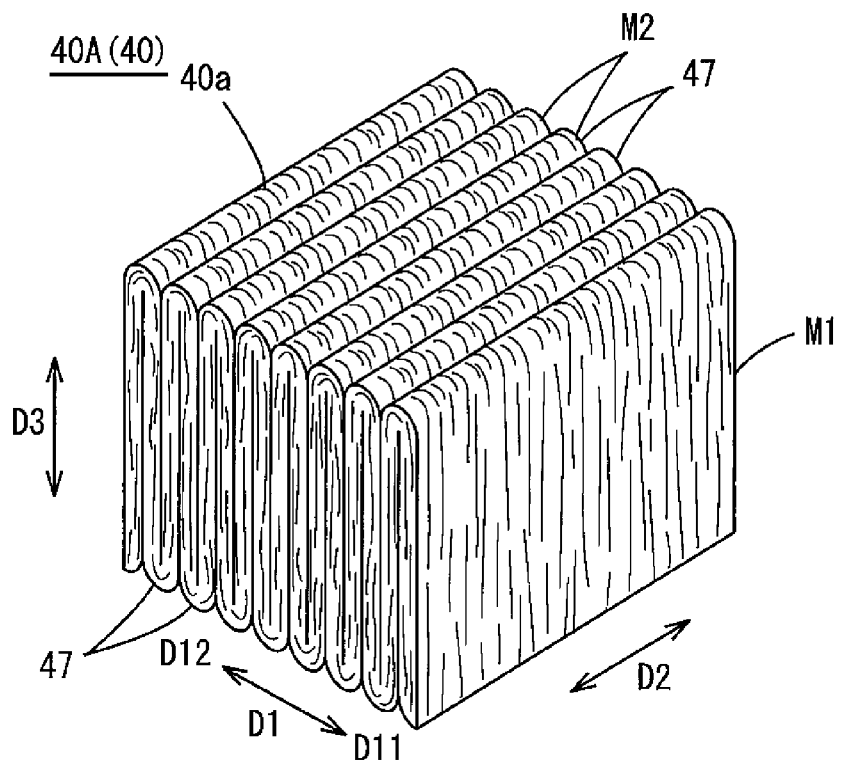
FIG. 8A is a perspective view showing an example of a main portion of the fiber structure 40A in which the folded-back portions 47 are kept remained.

As shown in FIG. 7 and FIG. 8A, the buffer material layer 50 is formed from a fiber structure 40A having a wavelike shape in which a web M1 is repeatedly folded and laminated in the thickness direction D3. As a result, the buffer material layer 50 is lightweight and bulky and has high sound absorbing properties. The buffer material layer 50 is formed from the fiber structure 40A, which includes main fibers 45 and adhesive fibers (binders) 46 both constituting fibers 44. The buffer material layer 50 is laminated in a range of equal to or greater than 20% of the vehicle body panel 80 side surface of the floor carpet 10. In other words, the buffer material layer 50 can be provided on the entire vehicle body panel 80 side surface of the floor carpet 10 or only on a part of the vehicle body panel 80 side surface of the floor carpet 10.

A thickness of the web 1 before folded can be, for example, about 5 to 10 mm, which is about 3 to 30% of a thickness of the fiber structure 40A. In addition, the number of folds (the number of pleats) of the web M1 can be about 1 to 10 per 20 mm, for example. As the number of folds per unit length becomes smaller, the density of the web M1 decreases, and therefore the web M1 can be formed easier. On the other hand, as the number of folds per unit length becomes larger, the density of the web M1 increases, and therefore shape retaining property is improved and load bearing capacity as a raising material is increased. Note that the number of folds of the web is defined by the number of pleats, and therefore the number of the webs per unit length is twice as much as the number of folds.

For manufacturing a buffer material in which a continuous web is repeatedly folded into a wavelike shape and laminated, a manufacturing apparatus can be appropriately selected from various buffer material manufacturing apparatuses using a well-known manufacturing method such as a STRUTO method.

For the buffer material manufacturing apparatus, a textile lap machine described in Japanese Translation of PCT Application No. 2008-538130, and a machine for repeatedly folding a continuous web into a wavelike shape by gears are known, for example.

As exemplified in FIG. 7, in each of pleats M2 of the fiber structure 40A formed by the buffer material manufacturing apparatus, the main fibers 45 and the adhesive fibers 46 are oriented in the thickness direction D3, except in folded-back portions 47. A part of the adhesive fibers 46 is melted and bonds the main fibers 45, which are orientated in a wavelike shape, with each other. As a result, the fiber structure 40A having the wavelike shape as shown in FIG. 8A is formed.

In the formed fiber structure 40A, the folded-back surfaces of the pleats M2 are matched with a plane passing through the width direction D2 and the thickness direction D3 of the fiber structure 40A, and the fibers 44 are oriented in the thickness direction D3. A top surface 40a and a reverse surface 40b where the folded-back portions 47 are assembled are formed along the lamination direction D1 of the pleats M2 (web M1). In this case, the width direction of the fiber structure 40A is corresponding with the width direction of the web M1. In addition, the lamination direction D1 of the web, the width direction D2 of the web and the thickness direction D3 of the fiber structure are perpendicular to each other. Further, in FIG. 7 or other figures, an extruding direction of the fiber structure 40A when extruded by the buffer material manufacturing apparatus is indicated as D11, and an opposite direction of the extruding direction D11 is indicated as D12. In this case, if the fibers 44 are oriented in the thickness direction D3, it means that an orientation direction of the fibers 44 matches relatively well with a direction perpendicular to the top surface 40a and the reverse surface 40b, and the fibers 44 can contain the folded-back portions 47.

For the fibers 44 constituting the fiber structure 40, fibers of synthetic resins (inclusive of elastomers), fibers obtained by adding an additive to synthetic resins, inorganic fibers, and reclaimed wool fibers can be used, for example.

For the main fibers 45, fibers of thermoplastic resins (inclusive of thermoplastic elastomers), fibers obtained by adding an additive to thermoplastic resins, inorganic fibers, and reclaimed wool fibers can be used, for example. In addition, fibers composed of thermoplastic resins such as a polyester (e.g. PET), a polyolefin (e.g. PP) and a polyamide, fibers composed of thermoplastic resins obtained by modifying the aforementioned thermoplastic resins to adjust a melting point thereof, glass fibers, rayon fibers, reclaimed wool fibers of clothing, regenerated cotton fibers, fibers of materials obtained by further adding an additive, and combinations of these fibers can also be used, for example. A fiber diameter of the main fibers can be about 5 to 60 μm, a thickness of the main fibers can be about 10 to 15 decitex, and a fiber length of the main fibers can be about 10 to 100 mm, for example. If the main fibers are thermoplastic fibers, a melting point of the thermoplastic fibers can be high melting point of about 250 to 260° C., for example.

For the adhesive fibers 46, fibers of thermoplastic resins and fibers obtained by adding an additive to thermoplastic resins can be used, for example. In addition, fibers composed of thermoplastic resins such as a polyester (e.g. PET), a polyolefin (e.g. PP or PE (polyethylene)) and a polyamide, fibers composed of thermoplastic resins obtained by modifying the aforementioned thermoplastic resins to adjust a melting point thereof, and fibers of materials obtained by further adding an additive can also be used, for example. If the main fibers are thermoplastic fibers, it is preferred that thermoplastic fibers having a melting point lower than that of the main fibers be used for the adhesive fibers. For example, if fibers having compatibility with the main fibers are used for the adhesive fibers, good adhesion of the main fibers and adhesive fibers can be obtained, and the buffer material layer 50 can be provided with sufficient shape retaining property. A melting point of the adhesive fibers can be about 100 to 220° C. (preferably about 120° C. or less), for example.

Further, for the adhesive fibers 46, fibers of a core-sheath structure, which is comprised of a sheath portion formed of fibers available for the adhesive fibers and a core portion formed of a material having a melting point higher than that of the sheath so that the sheath portion surrounds the outer circumference of the core portion, can also be used. In this case, fibers available for the main fibers 45 can be used for the core portion.

A fiber diameter of the adhesive fibers 46 can be about 10 to 45 μm, a thickness of the adhesive fibers 46 can be about 2 to 4 decitex, and a fiber length of the adhesive fibers 46 can be about 10 to 100 mm, for example. A compounding ratio of the main fibers 45 and adhesive fibers 46 can be about 30 to 95 wt. % for the main fibers and about 5 to 70 wt. % for the adhesive fibers.

Note that the fiber structure 40 can be also formed by using a non-fibrous binder instead of the adhesive fibers.

An average basis weight of the fiber structure 40 is preferably within a range of 300 to 1500 g/m$^2$, more preferably within a range of 500 to 800 g/m$^2$. A thickness of the fiber structure 40 is appropriately designed according to a vehicle shape within a range of 10 to 50 mm. A density of the fiber structure 40 is preferably within a range of 0.01 to 0.15 g/cm$^3$, more preferably 0.02 to 0.08 g/cm$^3$.

When a compressive strength of the fiber structure 40 was measured, it was 1.5 to 40 kPa when the density was 0.01 to 0.15 g/cm$^3$ and 2 to 15 kPa when the density was 0.02 to 0.08 g/cm$^3$. The compressive strength is a value obtained by measuring a compressive stress at a 25% strain using a precision universal testing machine AG-500A manufactured by Shimazu KK. The measurements are conducted under the following test conditions; specimen size: 50 mm×50 mm×thickness of 20 mm, compression rate: 10 mm/min, compression zone: entire surface, and no pre-compression.

Figure 8B:
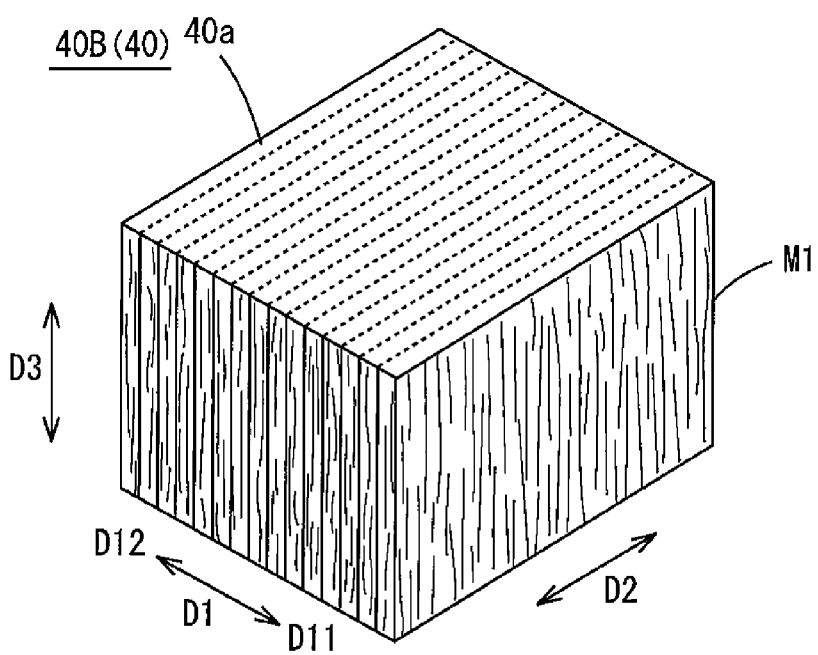
FIG. 8B is a perspective view showing an example of a main portion of a fiber structure 40B from which the folded-back portions 47 are cut off.

Any fiber structures can be used for forming the buffer material layer 50 as long as the fibers are oriented in the thickness direction. Accordingly, as shown in FIG. 8B, the fiber structure 40B in which the folded-back portions 47 of the top surface 40*a* and the reverse surface 40*b* of the above-described fiber structure 40A are cut out can be used. Further, a fiber structure obtained by dividing the fiber structure having a wavelike shape in an intermediate position of the thickness direction can be used.

As exemplified in FIG. 12, it is preferred that the heated carpet body 20 and fiber structure 40 are drawn in a state of being stacked together so as not to be separated. If the carpet body 20 and fiber structure 40 are stacked and press molded to be compressed in the thickness direction D3, the raised portion 32 having the convex ridge portions 33 is formed on the carpet layer 30 and the depressed portion 52 having the concave groove portions 53 is formed on the buffer material layer 50. In the above explained heat molding processes, the floor carpet 10 is stretched up to 200% at a position near the angular ridge portion 83 of the tunnel portion, compared to the general portion of the entire floor carpet.

At this time, in the stretched carpet body, tension is generated to press the buffer material toward a forming die by the convex ridge portion of the raised portion. The tension can be about 50 to 150 N per 50 mm width, for example. In the fiber structure having a high cushioning property in which the fibers are oriented in the thickness direction, if the compression molded portion recessed towards the convex ridge portion of the carpet body is not provided, the fiber structure is collapsed to about 10% at the maximum as shown in FIG. 13B yielding to the force applied from the carpet body (901) even if trying to keep the thickness of the depressed portion substantially constant. Consequently, in the floor carpet 900, the corner portion 904 is apart from the molding surface 913, which indicates a desired shape. Therefore, the desired shape cannot be maintained. In other words, the deeply raised portion is collapsed into a rounded shape without forming a sharp angular shape.

On the fiber structure 40 of the floor carpet 10, the concave groove portion (compression molded portion) 53, which is recessed away from the angular ridge portion (convex surface) 83 of the tunnel portion toward the convex ridge portion 33 of the carpet layer so that the thickness is 0.03 to 0.5 times of the thickness of a surrounding area and the density is higher than that of the surrounding area, is formed. The compression molded portion, which has a higher density than that of the surrounding area and has a higher rigidity, functions as a reinforced portion to support the carpet body against a pressing force applied from the carpet body. Consequently, the desired shape, which is an exact shape of the design drawing, of the floor carpet is maintained. In other words, the present invention can prevent an angular shape of the corner of the decorative layer, which is corresponding to the convex surface of the vehicle body panel, from being collapsed into a rounded shape and prevent a position of the upper surface of the raised portion from being relatively lowered compared to the position in the design drawing. Note that the rigidity can be compared by an elastic bending slope, for example.

Figure 3A:
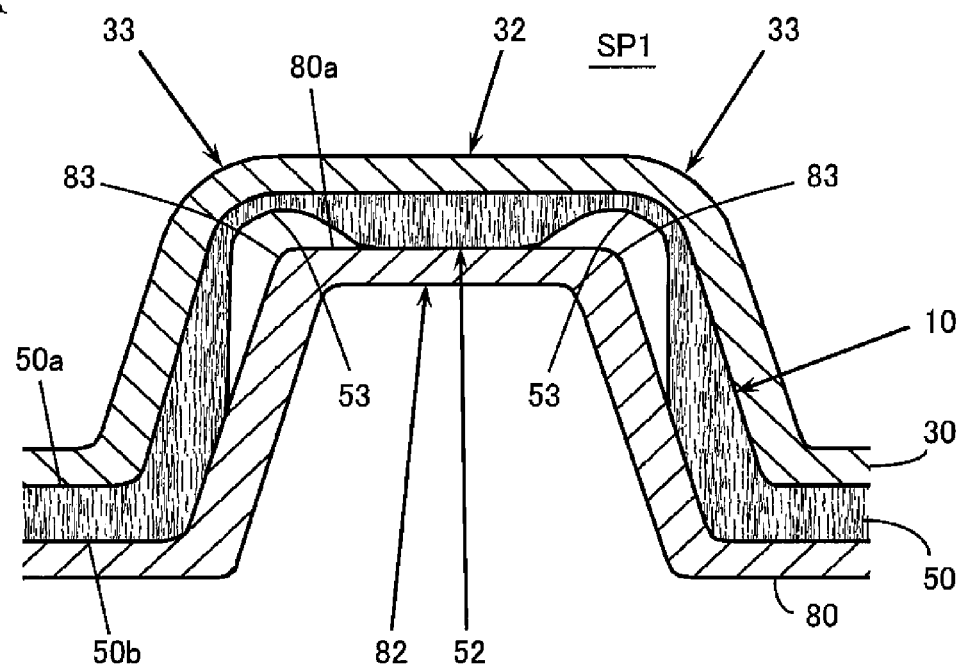
FIGS. 3A and 3B are vertical end surface views schematically showing an example of a main portion of the floor carpet 10.
Figure 3B:
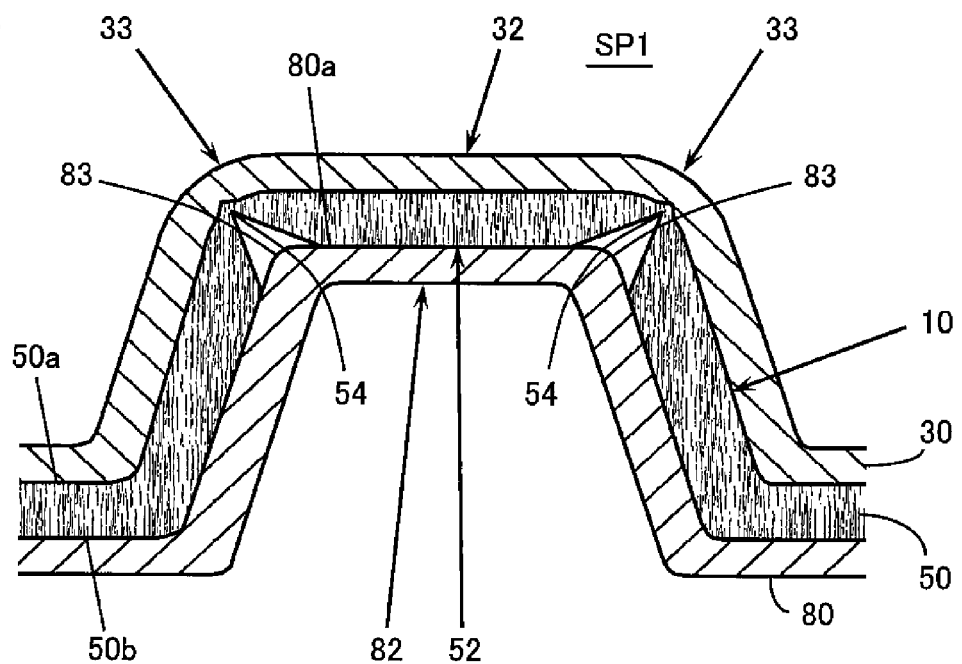

The compression molded portion can be various shapes as exemplified in FIGS. 3A and 3B.

FIG. 3A schematically shows the concave groove portion 53 formed to be an arc-shape when viewed in a vertical cross-section perpendicular to the extension direction. As also shown in FIG. 5, the concave groove portion 53 having an arc-shape in cross-section is recessed in a direction D21, which is a direction away from the angular ridge portion 83 of the vehicle body panel 80 toward the convex ridge portion 33 of the carpet layer 30. In this case, a boundary between the general portion 52*a* of the depressed portion 52 and the concave groove portion 53 can be a place where the depressed portion 52 begins to be apart from a vehicle compartment side surface 80*a* of the depressed portion 52 or a place where a gap between the depressed portion 52 and the vehicle compartment side surface 80*a* begins to increase. Further, the boundary can be a place where the depressed portion 52 begins to be recessed from the panel side surface 50*b*. The thickness T2 of the concave groove portion 53 is a thickness of the thinnest part. The thickness T2 is preferably 0.03 to 0.5 times and more preferably 0.05 to 0.25 times of the thickness of the surrounding area. If the thickness T2 is within the above range, the corner of the decorative layer, which is corresponding to the convex surface of the vehicle body panel, is prevented from being collapsed into a rounded shape.

A height of the concave groove portion 53, which is a separation length T3 of the concave groove portion 53 from the angular ridge portion 83 shown in FIG. 5, can be specified without exceeding the thickness T1 of the general portion 52*a*. It can be about 10 to 50 mm, for example. A width W1 of the concave groove portion 53 measured along the vehicle compartment side surface 80*a* of the vehicle body panel can be about 50 to 200 mm, for example. A length of the concave groove portion 53 measured along the extension direction can be 20 to 2000 mm, for example.

It is efficient to form the concave groove portion 53 when a corner of the raised portion of the decorative layer should be formed on the relatively large area or when deterioration of durability of the forming die is predicted if a protruding portion having an obtuse angle, a right angle or an acute angle is formed on the forming die.

Figure 6:
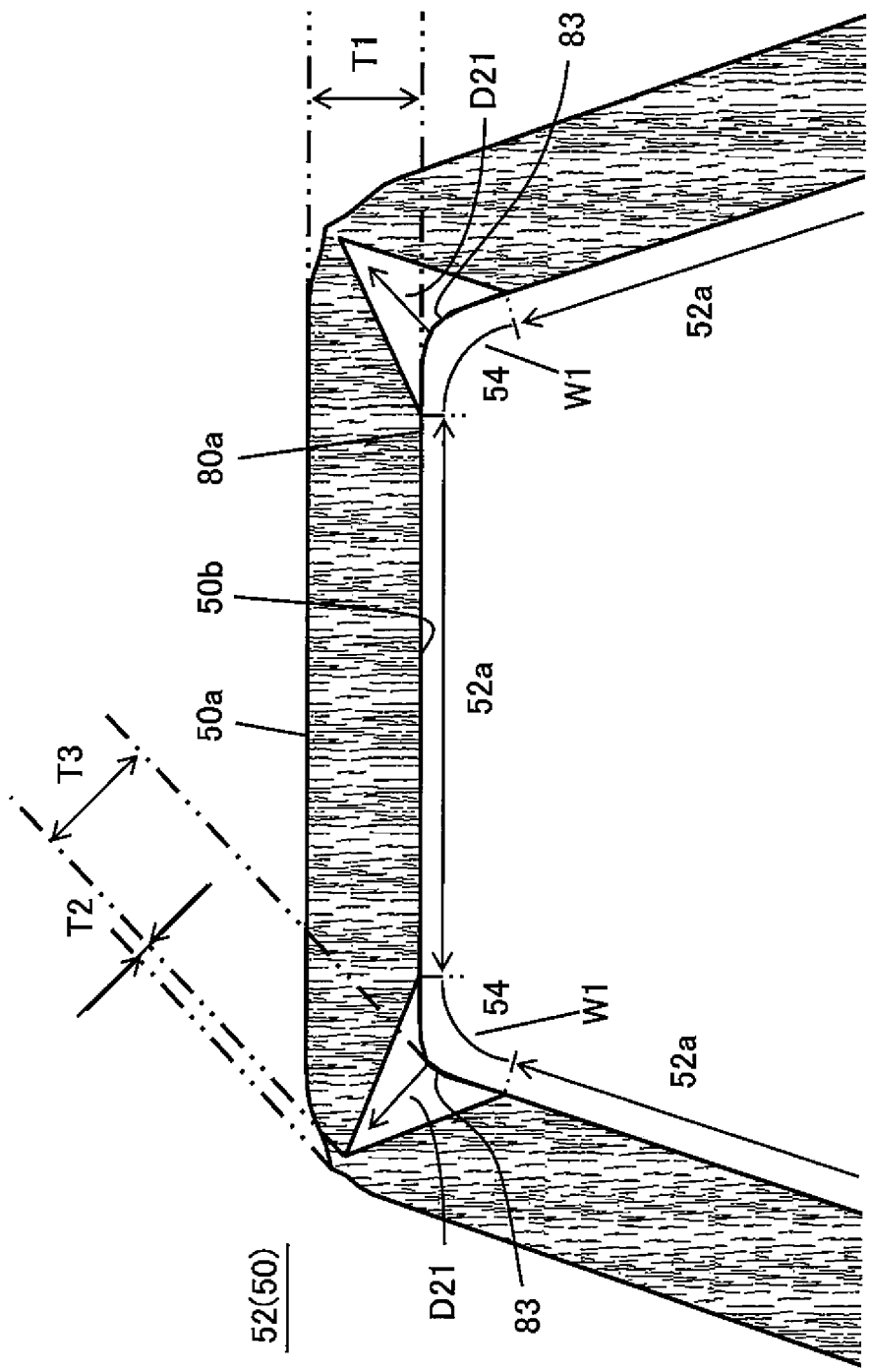
FIG. 6 is a vertical end surface view schematically showing an example of a main portion of the depressed portion 52 of the buffer material layer 50.

FIG. 3B schematically shows a concave groove portion 54 formed in a re-entrant angle shape when viewed in a vertical cross-section perpendicular to the extension direction. As also shown in FIG. 6, the concave groove portion 54 having the re-entrant angle shape in cross-section is recessed in a direction D21, which is a direction away from the angular ridge portion 83 of the vehicle body panel 80 toward the convex ridge portion 33 of the carpet layer 30. Also in this case, a boundary between the general portion 52*a* of the depressed portion 52 and the concave groove portion 54 can be a place where the depressed portion 52 begins to be apart from a vehicle compartment side surface 80*a* of the depressed portion 52 or a place where a gap between the depressed portion 52 and the vehicle compartment side surface 80*a* begins to increase. Further, the boundary can be a place where the depressed portion 52 begins to be recessed from the panel side surface 50*b*. The thickness T2 of the concave groove portion 54 is a thickness of the thinnest part. The thickness T2 is also preferably 0.03 to 0.5 times and more preferably 0.05 to 0.25 times of the thickness of the surrounding area. If the thickness T2 is within the above range, the corner of the decorative layer, which is corresponding to the convex surface of the vehicle body panel, is prevented from being collapsed into a rounded shape.

A height of the concave groove portion 54, which is a separation length T3 of the concave groove portion 54 from the angular ridge portion 83 shown in FIG. 6, can be specified without exceeding the thickness T1 of the general portion 52*a*. The height of the concave groove portion 54 can be about 10 to 50 mm, for example. A width W1 of the concave groove portion 54 measured along the vehicle compartment side surface 80*a* of the vehicle body panel can be about 1 to 200 mm, for example. A length of the concave groove portion 54 measured along the extension direction can be 20 to 2000 mm, for example.

A cross-sectional shape of the concave groove portion 54 can be a substantially triangular shape whose apex is oriented in the carpet layer. Further, the apex of the triangular shape can be rounded or other swollen cross-sectional shapes can be used instead.

The lamination direction D1 of the web M1 in relation to the extension direction of the concave groove portion can be arbitrarily determined according to a shape of the floor surface of the vehicle body or other conditions.

Figure 9A:
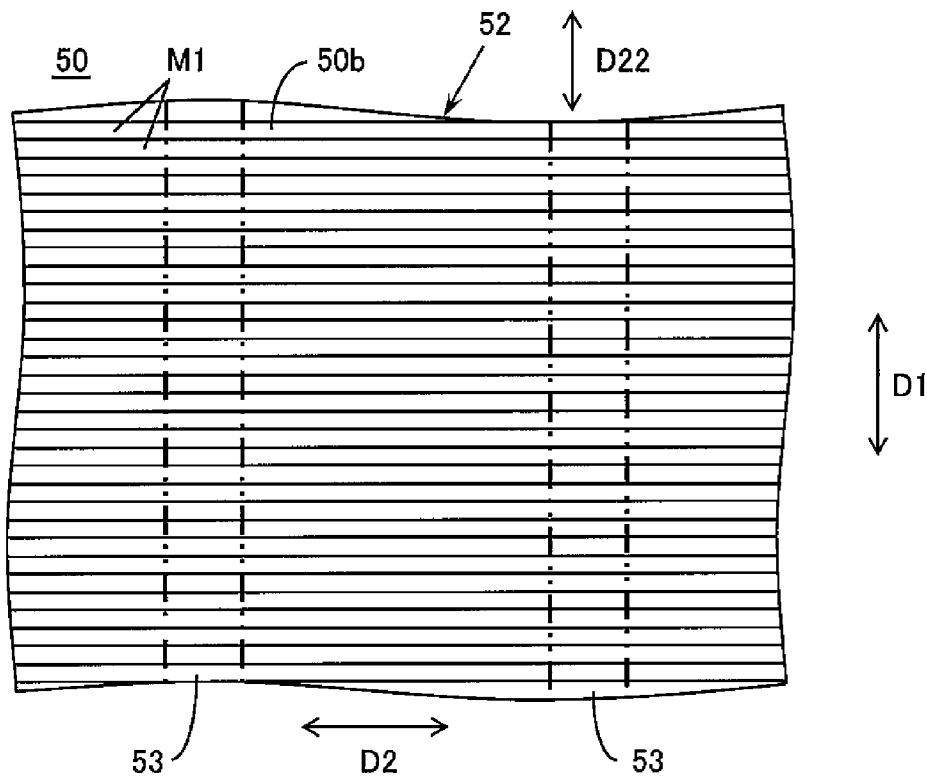
FIG. 9A is a bottom view schematically showing an example of a main portion of the buffer material layer 50 in which a lamination direction D1 of a web M1 is oriented in an extension direction D22 of a concave groove portion (compression molded portion) 53.
Figure 9B:
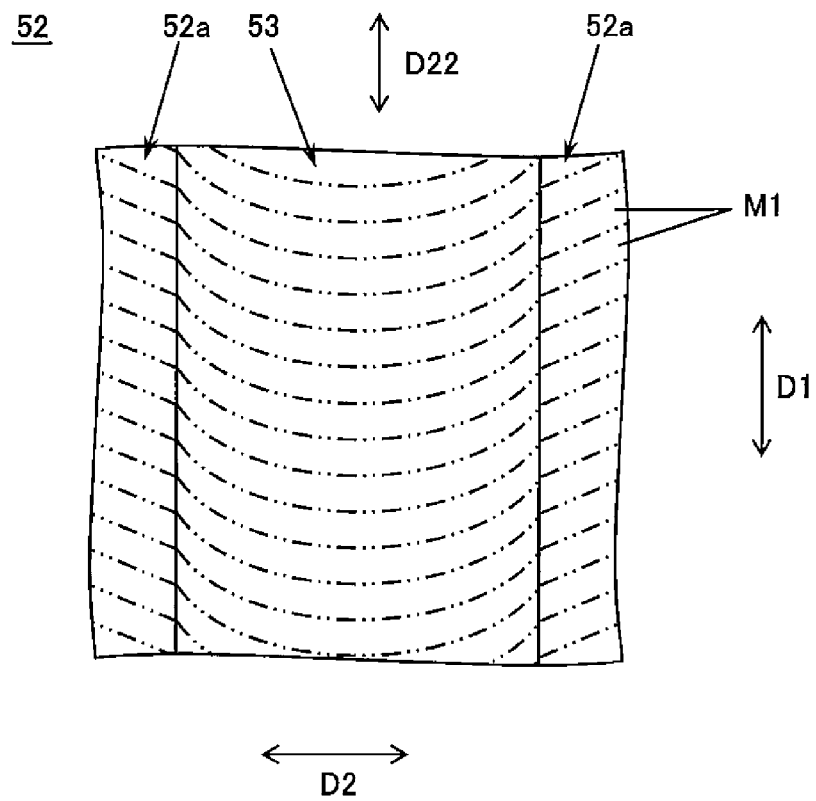
FIG. 9B is a drawing schematically showing an example of the concave groove portion 53 of FIG. 9A from diagonally below.

FIG. 9A schematically shows a bottom surface side of the buffer material layer 50 in which the lamination direction D1 of the web M1 is oriented in an extension direction D22 of the concave groove portion 53. FIG. 9B schematically shows the concave groove portion 53 of FIG. 9A from diagonally below. In FIG. 9B, the position of the concave groove portion 53 is shown by two-dot chain lines.

The buffer material layer 50 having the concave groove portion 53 is formed by press molding the fiber structure 40 in which the lamination direction D1 of the web is oriented in the extension direction D22 of the concave groove portion. In the buffer material layer 50, the width direction D2 of the web M1 is approximately perpendicular to the extension direction D22 of the concave groove portion, and boundaries between the webs M1 are continuously crossing the concave groove portion 53. Therefore, the rigidity of the concave groove portion 53 is increased and therefore the convex ridge portion of the decorative layer can be maintained in a predetermined shape. These properties are suitable for preventing an angular shape of the corner of the decorative layer, which is corresponding to the angular ridge portion 83 of the raised portion of the vehicle body panel, from being collapsed into a rounded shape.

Figure 10A:
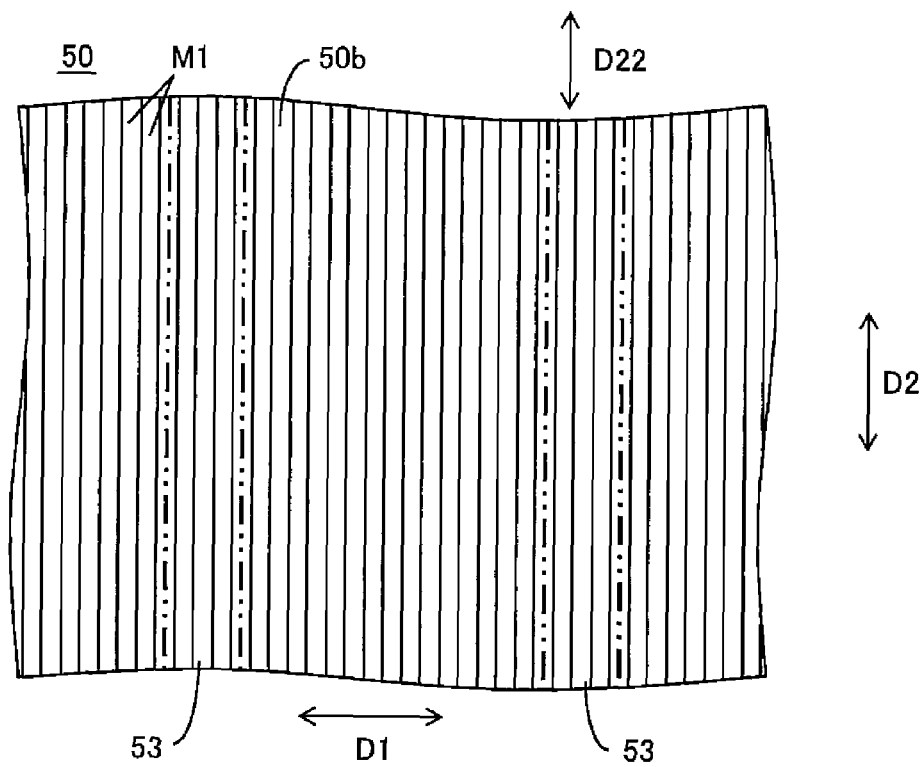
FIG. 10A is a bottom view schematically showing an example of a main portion of the buffer material layer 50 in which a width direction D2 of the web M1 is oriented in the extension direction D22 of the concave groove portion 53.
Figure 10B:
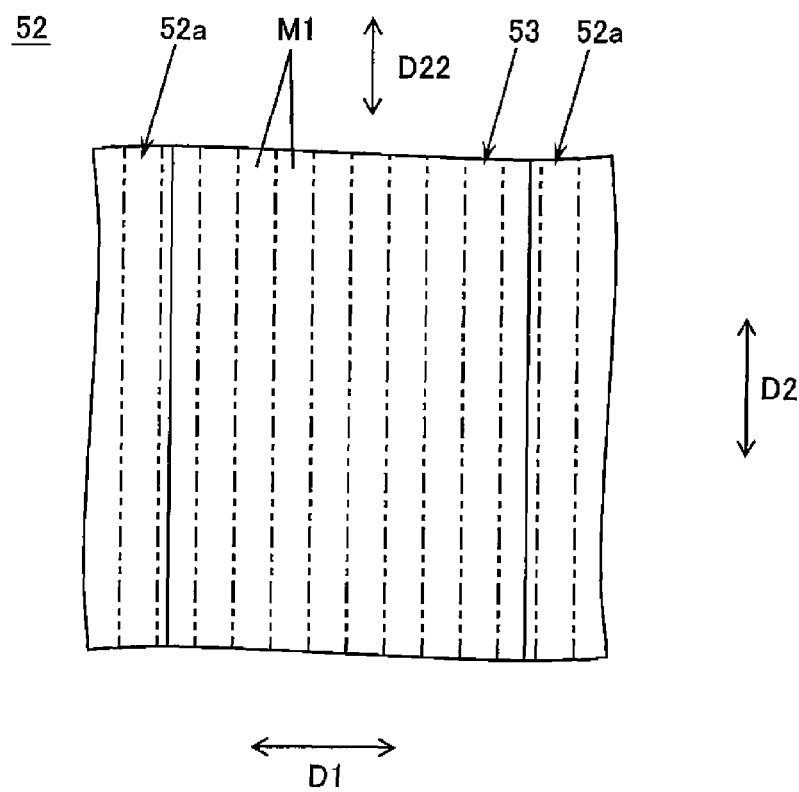
FIG. 10B is a drawing schematically showing an example of the concave groove portion 53 of FIG. 10A from diagonally below.

FIG. 10A schematically shows a bottom surface side of the buffer material layer 50 in which the width direction D2 of the web M1 is oriented in the extension direction D22 of the concave groove portion 53. FIG. 10B schematically shows the concave groove portion 53 of FIG. 10A from diagonally below. In FIG. 10A, the position of the concave groove portion 53 is shown by two-dot chain lines.

The buffer material layer 50 having the concave groove portion 53 is formed by press molding the fiber structure 40 in which the width direction D2 of the web is oriented in the extension direction D22 of the concave groove portion. In the buffer material layer 50, the lamination direction D1 of the web M1 is approximately perpendicular to the extension direction D22 of the concave groove portion, and boundaries between the webs M1 are not crossing the concave groove portion 53 at all or almost at all. Therefore, formability of the concave groove portion 53 is increased.

(2) Manufacturing Method of Molded Interior Material for Vehicle, Operation and Effect FIG. 11 exemplifies a manufacturing method of the floor carpet (molded interior material for a vehicle) 10. FIG. 12 exemplifies a main portion of a press molding machine 200 in a vertical end surface view. A manufacturing process is started in a state that an original roll of the carpet body 20, which is not yet molded, is placed in a predetermined location, and the fiber structure 40, which is not yet molded and cut according to the size of the floor carpet 10 to be formed, is placed in a cut felt stockyard.

First, the carpet body 20 is conveyed from the original roll to a cutting machine (step S1), and the carpet body 20 is cut into a predetermined length according to the size of the floor carpet 10 to be formed (step S2). The cut carpet body 20 is conveyed to a heating unit such as an infrared radiation heater and heated on both surfaces by radiation heating or the like to soften the base layer 25 (step S3). The heated and softened carpet body 20 is conveyed to the press molding machine 200 (step S4).

Meanwhile, the fiber structure 40 is conveyed from the cut felt stockyard to a heater such as a suction heater (hot air circulation heater) (step S5), and heated at a temperature higher than a melting point of the adhesive fibers 46 by a hot air heating or the like to soften the adhesive fibers 46 (step S6). The heated fiber structure 40 is conveyed to the press molding machine 200 (step S7).

FIG. 12 is a vertical end surface view schematically showing how the carpet body 20 and the fiber structure 40 are simultaneously press molded into a stacked state. In the press molding machine 200 shown in FIG. 12, an upper mold 212 and a lower mold 214 both constituting a forming die 210 are provided so that they can be brought close to each other and withdrawn from each other. In this configuration, the upper mold 212 is a metal mold having, as the lower surface thereof, a molding surface 213 so as to match with a shape of a concavo-convex shape 31 of the floor carpet on the vehicle compartment side, such as a shape of the convex ridge portion 33 of the carpet layer. The lower mold 214 is a metal mold having a convex ridge portion (convex portion) 216 to form the concave groove portion 53 of the buffer material layer and having, as the upper surface thereof, a molding surface 215 so as to match with a shape of the concavo-convex shape 51 of the floor carpet on the vehicle body panel side. The heated carpet body 20 and fiber structure 40 are arranged so that the carpet body 20 is arranged on the upper mold 212 side and the fiber structure 40 is arranged on the lower mold 214 side. Of course, the base layer 25 of the carpet body and the top surface 40a (or the reverse surface 40b) of the buffer material are arranged facing each other, the pile 26 of the carpet body is arranged facing the upper mold 212, and the reverse surface 40b (or the top surface 40a) of the buffer material is arranged facing the lower mold 214. In this state, if the upper mold 212 and the lower mold 214 are brought close to each other, the floor carpet 10, which is not yet trimmed, is press molded (the above described step S8).

If the fiber structure 40 includes a binder such as the adhesive fibers 46, the both layers 30 and 50 are bonded together by the binder of the fiber structure 40 even when the base layer 25 of the carpet body has no adhesive backing.

The floor carpet, which is not yet trimmed, is taken out of the press molding machine 200 after cooling and conveyed to an outer circumference cutting machine (step S9), and then removed from the mold. Note that the carpet body and the fiber structure have flexibility even after the molding process, and therefore the floor carpet 10 can be taken out of the mold by bending the floor carpet 10 even if there is an undercut portion to a certain extent. After removed from the mold, the floor carpet 10, which is not yet trimmed, is cut on the outer circumference by the outer circumference cutting machine (step S10) to form the floor carpet 10. Note that the cutting method in step S10 can be a cutting using a cutting blade or a water jet cutting. Further, steps S9 and S10 can be omitted. In such a case, in a state that the floor carpet is press molded by the molds 212 and 214, which are brought close to each other in step S8, the floor carpet can be manually cut on the outer circumference by using a cutter. In the floor carpet to be formed, the carpet layer 30, which is held in the concavo-convex shape 31 including the convex ridge portion 33, and the buffer material layer 50, which is held in the concavo-convex shape 51 including the concave groove portion 53, are at least laminated and integrated.

A manufacturing method of the floor carpet 10 is not limited to the above-described method. For example, in step S3, the carpet body 20 can be heated by the suction heater. Further, the carpet body 20 and the fiber structure 40 can be simultaneously heated in the stacked state by the suction heater. In this case, a radiation heating by the infrared radiation heater is preferably done simultaneously with the heating by the suction heater so as to ensure the sufficient amount of heat.

The concave groove portion 53 formed on the buffer material layer 50 is recessed away from the angular ridge portion 83 of the vehicle body panel toward the convex ridge portion 33 of the carpet layer so that the thickness T2 is 0.03 to 0.5 times of the thickness T1 of a surrounding area to increase the density and rigidity. Consequently, the corner of the decorative layer, which is corresponding to the convex surface of the body panel, is almost maintained according to the design drawing. In other words, an angular shape of the corner of the decorative layer is prevented from being collapsed into a rounded shape and a position of the upper surface of the raised portion is prevented from being relatively lowered than the predetermined position.

Therefore, the present invention can provide a method to prevent the corner of the decorative layer, which is corresponding to the convex surface of the vehicle body panel, from being collapsed into a rounded shape and a method for maintaining the angular shape of the corner of the decorative layer by forming the compression molded portion on the buffer material layer of the molded interior material.

(3) Variation Examples

Note that the following variation examples of the present invention can be considered.

For example, in addition to the floor carpet, the molded interior material for a vehicle of the present invention can be applied to door trims, luggage side trims, side wall trims such as a pillar garnish interior material, dash silencers and roof liner interior materials. Therefore, the decorative material for forming the decorative layer is not limited to the carpet base. It can be a nonwoven fabric, a woven material, a knitted material, and a leather, for example. From these decorative materials, the decorative layers such as a nonwoven fabric layer, a woven layer, a knitted layer and a leather layer can be formed.

In the molded interior material for a vehicle, another layer may be provided between the decorative layer and the buffer material layer. Another layer can be a perforated resin layer, a sound absorbing layer, a soundproofing layer such as an impermeable resin layer, and so on.

In addition, a felt or the like can be post-applied to a surface of the vehicle body panel side of the molded interior material for a vehicle having the buffer material layer, which functions as the buffer material for a vehicle. The felt can be a fiber structure in which the constituent fibers are oriented in the thickness direction, a flat felt, or a molded felt.

In the molded interior material for a vehicle explained above, the decorative layer and the buffer material layer can be separable.

The convex surface of the vehicle body panel is not limited to the angular ridge portion of the tunnel portion. It can be a bulged surface and a projecting surface whose longitudinal direction is oriented in the vehicle width direction, or can be a bulged surface and a projecting surface having a spot-like shape, for example.

The convex portion of the decorative layer is not limited to the convex ridge portion 33 of the raised portion. It can be a bulged surface and a projecting surface whose longitudinal direction is oriented in the vehicle width direction, or can be a bulged surface and a projecting surface having a spot-like shape, for example.

The compression molded portion of the buffer material layer is not limited to the concave groove portions 53 and 54. It can be a concave surface and a recess whose longitudinal direction is oriented in the vehicle width direction, or can be a concave surface and a recess having a spot-like shape, for example.

(4) Practical Examples

Hereafter, although the present invention will be explained concretely showing practical examples, the present invention is not limited to the following examples.

Making a Sample of Floor Carpet

For the carpet body, a needle punched carpet (dilour needle punched, average basis weight: 250 g/m$^2$) with a thermoplastic backing resin (musback, specific gravity: 1.5, average basis weight: 2000 g/m$^2$) was used.

For main fibers, 70 wt. % of a regular polyester fiber (average fiber diameter: 14 dtex, average fiber length: 64 mm) having a melting point of 250 to 260° C. and 30 wt. % of a core-sheath structure fiber (average fiber diameter: 2 dtex, average fiber length: 51 mm, content rate of low melting point resin: 30 wt. %) were mixed and aligned by a carding process to form a web having a weight per unit area of 40 g/m$^2$ and a thickness of 5 mm. The core-sheath structure fiber was comprised of a core made of a regular polyester fiber and a low melting point resin made by denaturing polyester to surround the core. The web was repeatedly folded in the top/reverse direction to form the fiber structure having the thickness of 25 mm and the number of folds per unit length of 100 times/1000 mm.

For the forming die, a pair of male and female press forming dies (water cooling) was used to press molding a floor carpet as shown in FIG. 1 for a general sedan car, which had a length of 1650 mm in the vehicle front-rear direction, a width of 1350 mm in the vehicle width direction, and a tunnel portion formed at the center in the vehicle width direction from front to rear of the vehicle. In this case, only at a position corresponding to the left-hand concave groove portion of the concave groove portions 53, 53 shown in FIG. 1, an isosceles triangle shape in cross-section having a bottom width of 10 mm and the height of 20 mm was provided extending to a length of 300 mm on the lower mold of the press forming die as an initial shape. In other words, the concave groove portion having a substantially triangular shape in cross-section was formed near only one of the convex ridge portions arranged on left and right of the raised portions, and the concave groove portion was not formed on the other convex ridge portion.

The original roll, in which the carpet body and the fiber structure are laminated, was heated at 210° C. for 70 seconds in a hot-air heating furnace to plasticate the components of the thermoplastic resin having low melting point included in the carpet body and the fiber structure. The original roll, which was plasticated, was placed between the upper mold and the lower mold and drawn to a predetermined shape to fit the shape of the floor panel, and then the original roll was cooled to solidify the thermoplastic resin and fix the molded shape. A width of the raised portion of the carpet layer was 190 to 220 mm, a height was 130 to 200 mm, and a degree of stretching of the original roll near the angular ridge portion of the carpet layer was 1.2 to 1.5.

Evaluation of Samples of Floor Carpet

After the sample of the floor carpet was removed from the mold, the molded shape was compared between the left and right of the raised portion.

A thickness of the depressed portion of the buffer material layer was 15.0 mm at the general portion and 7.5 mm at the concave groove portion, which was 50% of the general portion.

In the depressed portion of the buffer material layer, an appearance was compared by visual observation between the corner portion on which the concave groove portion was formed and the corner portion on which the concave groove portion was not formed. In a sample on which the concave groove portion was not formed, the convex ridge portion (904) was collapsed into a rounded shape as shown in FIG. 13B. On the other hand, in a sample on which the concave groove portion was formed, the convex ridge portion (33) was not collapsed as shown in FIG. 3A.

In addition, the actual shape was measured at the left and right of the raised portion and compared with the design drawing. In a sample on which the concave groove portion was not formed, the convex ridge portion (corner portion 904 shown in FIG. 13B) of the raised portion of the carpet layer was misaligned 9.0 mm at the maximum from the design drawing, which is the molding surface 913 shown in FIG. 13B. On the other hand, in a sample on which the concave groove portion was formed, the convex ridge portion (convex ridge portion 33 shown in FIG. 3A) of the raised portion of the carpet layer was misaligned only 1.0 mm or less from the design drawing, which is the molding surface 21 shown in FIG. 12, therefore the sample was formed with high accuracy.

From the above, it is confirmed that if the compression molded portion, which is recessed toward the convex portion of the decorative layer and had a higher density than that of the surrounding area, is formed on the buffer material layer, an angular shape of the corner of the decorative layer is prevented from being collapsed into a rounded shape.

(5) Summary

Note that the fiber structure is not limited to the structure in which the web is repeatedly folded in the thickness direction and laminated. The fiber structure can be any materials as long as the fibers are oriented in the thickness direction. For example, the fiber structure in which the fibers are oriented in the thickness direction can be formed by cutting the web along the width direction into a strip shape and laminating the strip shaped web so that the fibers are oriented in the thickness direction.

Of course, the above-described basic operation and effect can be obtained even with the molded interior material for a vehicle having only the features set forth in the independent claims and having no features set forth in the dependent claims.

As described above, according to various embodiments of the present invention, a technology to prevent an angular shape of the corner of the decorative layer, which is corresponding to the convex surface of the vehicle body panel, is prevented from being collapsed into a rounded shape.

The present invention can be also implemented by replacing the features disclosed in the above-described embodiments and variation examples with each other or changing the combinations thereof, and the present invention can be also implemented by replacing the conventional features and the features disclosed in the above-described embodiments and variation examples with each other or changing the combinations thereof. The present invention includes these features.

What is claimed is:

1. A molded interior material for a vehicle, wherein
a press molded decorative layer that faces a vehicle compartment and a buffer material layer that faces a vehicle body panel having a convex surface are at least laminated, the buffer material layer formed by press molding a fiber structure in which fibers are oriented in a thickness direction,
a convex portion corresponding to the convex surface of the vehicle body panel is formed on the decorative layer, and
a compression molded portion, which is recessed away from the convex surface of the vehicle body panel toward the convex portion of the decorative layer so that a thickness of the compression molded portion is 0.03 to 0.5 times of a thickness of a surrounding area and a density of the compression molded portion is higher than that of the surrounding area, is formed on the buffer material layer.

2. The molded interior material for a vehicle according to claim 1, wherein
the convex surface is an angular ridge portion of a raised portion of the vehicle body panel,
a convex ridge portion corresponding to the angular ridge portion is formed as the convex portion on the decorative layer, and
a concave groove portion, which is recessed away from the angular ridge portion of the raised portion of the vehicle body panel toward the convex ridge portion of the decorative layer so that a thickness of the concave groove portion is 0.03 to 0.5 times of a thickness of a surrounding area and a density of the concave groove portion is higher than that of the surrounding area, is formed as the compression molded portion on the buffer material layer.

3. The molded interior material for a vehicle according to claim 2, wherein
the fiber structure is formed by repeatedly laminating webs so that the fibers are oriented in the thickness direction, and
the buffer material layer is formed by press molding the fiber structure in which a lamination direction of the webs is oriented in an extension direction of the concave groove portion.

4. The molded interior material for a vehicle according to claim 1, wherein
the compression molded portion, which is recessed away from the convex surface of the vehicle body panel toward the convex portion of the decorative layer, is formed to be an arc-shape in cross-section.

5. The molded interior material for a vehicle according to claim 1, wherein
the compression molded portion, which is recessed away from the convex surface of the vehicle body panel toward the convex portion of the decorative layer, is formed to be a re-entrant angle shape in cross-section.

6. A manufacturing method of a molded interior material for a vehicle, wherein
a decorative layer that faces a vehicle compartment and a buffer material layer that faces a vehicle body panel having a convex surface are at least laminated, characterized in that
at least a decorative material to form the decorative layer and a fiber structure in which fibers are oriented in a thickness direction to form the buffer material layer are press molded, a convex portion corresponding to the convex surface of the vehicle body panel is formed on the decorative layer, and a compression molded portion, which is recessed away from the convex surface of the vehicle body panel toward the convex portion of the decorative layer so that a thickness of the compression molded portion is 0.03 to 0.5 times of a thickness of a surrounding area and a density of the compression molded portion is higher than that of the surrounding area, is formed on the buffer material layer.

* * * * *